United States Patent [19]

Larsson

[11] Patent Number: 4,537,568
[45] Date of Patent: Aug. 27, 1985

[54] FORCE PUMP

[75] Inventor: Gösta Larsson, Värnamo, Sweden

[73] Assignee: Jochnick & Norrman Press AB, Värnamo, Sweden

[21] Appl. No.: 674,479

[22] Filed: Nov. 23, 1984

Related U.S. Application Data

[63] Continuation of Ser. No. 418,356, Sep. 15, 1982, abandoned.

[51] Int. Cl.³ .................. F04C 2/18; F04C 13/00; F04C 15/00
[52] U.S. Cl. .................................. 418/202; 425/224
[58] Field of Search .................. 418/202, 205, 206; 425/376 A, 224

[56] References Cited

U.S. PATENT DOCUMENTS

| 1,694,208 | 12/1928 | Davies | 418/202 |
| 2,714,857 | 8/1955 | Albright | 418/202 |
| 2,982,221 | 5/1961 | Whitfield | 418/202 |

FOREIGN PATENT DOCUMENTS 117097  7/1918  United Kingdom ............... 418/202

Primary Examiner—William R. Cline
Assistant Examiner—John J. McGlew, Jr.
Attorney, Agent, or Firm—Pollock, Vande Sande & Priddy

[57] ABSTRACT

A gear pump for injection molding and extrusion of elastomer material, where the material is inserted in strip form through slots into tooth spaces in a known manner. The gears have circumferential grooves in their mid portions, and a tongue is inserted into the groove in the region of gear engagement. Dividing-and-sealing members are fitted into the gear grooves at locations between the region of engagement and the insertion slots for the elastomer strips.

4 Claims, 4 Drawing Figures

FORCE PUMP

This application is a continuation of application Ser. No. 418,356, filed Sept. 15, 1982, now abandoned.

The invention relates to a gear pump for injection molding and extrusion of rubber and other elastomers, comprising two gears mounted in a housing and in engagement with each other, two entrance holes for introduction of strip starting material into the spaces between the gears and the housing, and channel means for discharging the product out of the area where the gears are in engagement.

In extrusion and injection molding of rubber and similar materials, it is usual to allow the product to be pressed and subjected to shearing forces and be freed of gases, attempting to achieve a suitable rise in temperature and initial vulcanization. It is suitable to achieve a degree of vulcanization at discharge of about 75%. The most common means used is a screw arrangement resembling a meat grinder. These machines are however rather expensive because of the necessary precision due to the high pressures required (several hundred $kg/cm^2$).

An alternative device has been designed by the presented applicant and is described in Swedish Published Application No. 320,188. This device is not based on the screw principle but on the principle of the gear pump. The starting material used is in the form of strips of the same width as the gears and two identical strips are inserted in individual slots into the space between the gears and the housing in which the gears rotate. The strips are thereby chopped into pieces fitting into the gear tooth spaces, and these pieces are then transported to the region where the gears of the gear pump engage, where the rubber is pressed outwards towards the channels in the ends of the housing. Thus the rubber is masticated primarily when moved axially in the gear spaces and possibly further in the channels, depending on their design.

One advantage of using a gear pump is that a gear pump is relatively inexpensive to manufacture. Another advantage is that the dimensions of a gear pump are rather small, and above all the longitudinal dimension is in no way comparable to that required in a screw pump of the type in question. A screw injector with a capacity of 25 kg/min. can, for example, be 4-5 meters long and weigh 7-8 tons. Furthermore, since a screw pump is substantially less efficient than a gear pump, the power consumption will be greater for the same output, possibly about three times greater.

Thus, in principle, many factors indicate the preferability of a gear pump over a screw pump. However, experience has demonstrated that the gear pump design has a number of disadvantages. A particular weakness has been the problem of sealing. For obvious reasons, it is impossible to make a gear pump without clearance between the circular end surfaces of the gears and the pump housing. The pressure on the rubber is considerable, often about 500 $kg/cm^2$, and rubber will be pressed into the space between the gear and pump housing, and it is difficult to prevent rubber from penetrating into the gear bearing, even though scrapers and the like are provided. Rubber contains additives which are abrasive in many cases, the practical result being that the bearing packings must be replaced after processing about 60-70 tons of material.

Another disadvantage of the known design is that the mastication has been exclusively concentrated in the region where the gear teeth engage, the gear teeth only functioning as conveyor means for the chopped pieces of rubber strips before engagement.

One object of the present invention is a gear pump, of the type described in the introduction, which avoids said disadvantages.

According to the invention, this is achieved by subjecting the product to pressure as soon as it has reached the dividing-and-sealing members in the gear grooves, which members divide the strip starting material which is forced into the tooth spaces. On the other side of said members, the space in the grooves will act as a connection between the tooth spaces which, unlike the prior art devices, will not merely transport the chopped pieces of rubber. The pressure created upon tooth engagement will thus be able to be propagated via the groove back to the dividing-and-sealing means and thus to all the intermediate tooth spaces. Furthermore, since discharge of the masticated product will take place in the middle instead of, as in the prior art devices, at the ends of the gears, the sealing problems at the ends of the gears will be substantially alleviated. It should be especially noted that the rubber will be first moved outwards in the tooth spaces and then inwards towards the middle, both increasing and distributing the mastication effect.

In accordance with a preferred embodiment, the gears are herringbone gears with the central groove of each gear passing through the intersection of the gear tooth lines. The direction of rotation of the gears is such that the portion of each tooth closest to the groove is the last portion of each tooth to enter into engagement. Thus gradual engagement is obtained in each tooth space, pressing the rubber therein towards the middle. This further improves the mastication and also alleviates the sealing problem at the ends of the gears in the region of gear engagement, where the difficulties were previously greatest.

Suitable dividing-and-sealing members can comprise cylinders inserted into the grooves. These can completely fill the width of the groove, but according to a preferred embodiment, sharp edged members are fitted into the grooves and point counter to the direction of movement of the gears. These members are anchored against being pulled along by the rotating gears by bolts inserted from the outside and fastened in the gear pump housing and sticking into holes in the members filling the entire width of the grooves.

The invention will now be described in more detail with reference to non-limiting examples, which are illustrated in the figures.

Figure 1:
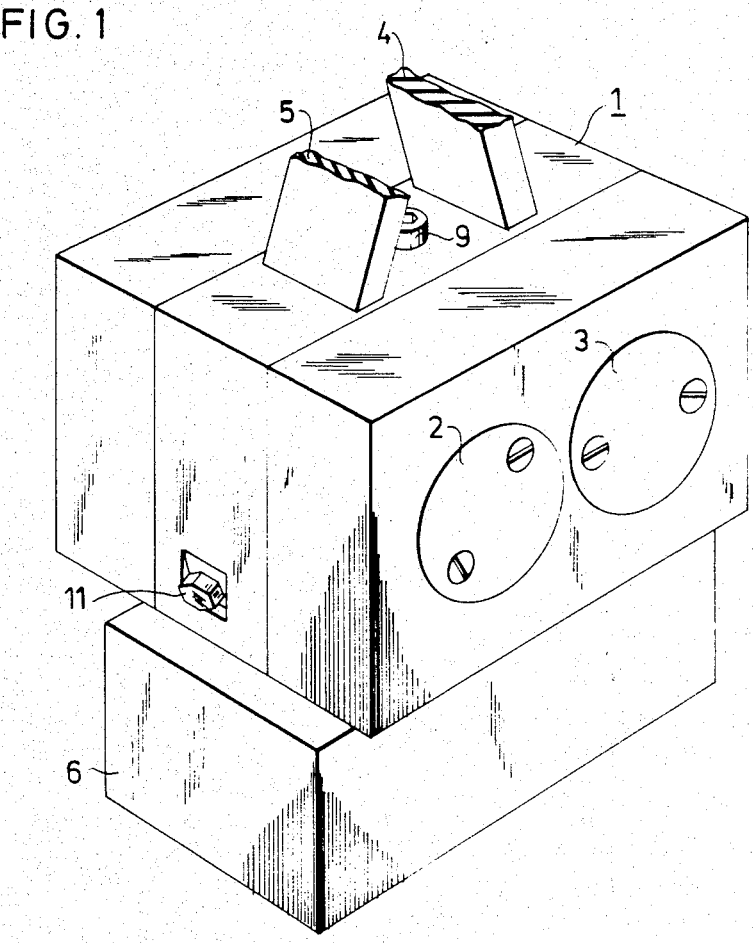
FIG. 1 shows a schematic view of a gear pump.

FIG. 1 shows a gear pump 1 for rubber and other elastomer products which are fed in the form of strips 4 and 5 into the pump and which are discharged in the form of masticated material into a mold 6 or the like. The schematic figure, which does not show the drive side where one of the gears is driven by a drive shaft, only shows the ends 2 and 3 of the gears.

Figure 2:
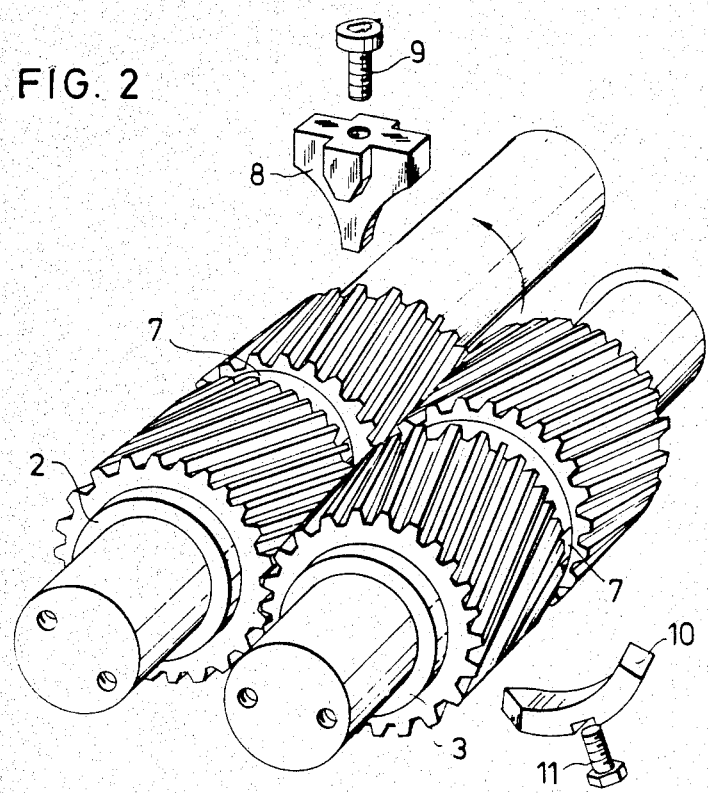
FIG. 2 shows an exploded view of the gears in the gear pump, a tongue and dividing-and-sealing members.
Figure 3:
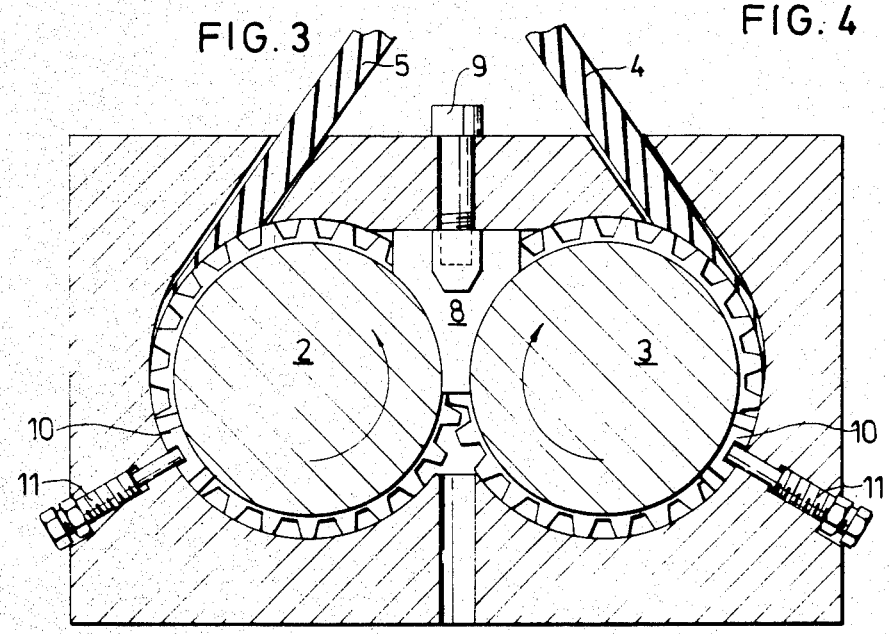
FIG. 3 shows a section through the gear pump in a plane through the circumferential grooves of the gears.

FIG. 2 shows the two gears 2 and 3 in an exploded view, and FIG. 3 shows a section through the circumferential grooves 7 of the gears. As can be seen from these figures, the gears are provided with grooves 7, rectangular in section, which lie approximately in the middle of the toothed portions and are somewhat deeper than the tooth spaces. Upon engagement, a gap will be created limited by two cylindrical surfaces and two planar surfaces. Into this gap there is inserted a tongue 8 in a direction counter to the rotational movement of the gears, said tongue being defined by two planar surfaces and two cylindrical surfaces designed to fit against the two said cylindrical surfaces upon gear engagement. The tongue is pressed down by means of a screw 9 which is screwed against the tongue from the pump housing. The entered elastomer will exit through channel means shown at the lower portion of FIG. 3.

FIGS. 2 and 3 also show dividing-and-sealing members 10 inserted into the grooves somewhat below the common center-plane of the gears. These members divide the inserted rubber strips 4 and 5 and press the divided strip portions into the tooth spaces. The members 10 are of such shape that they substantially fill out the space formed between the cylindrical wall of the housing and the walls of the circumferential grooves 7, and thus they are able to maintain a pressure in the gear pump between said members and the region of engagement between the gears. The members are anchored from the outside by means of screwed-in bolts 11.

Figure 4:
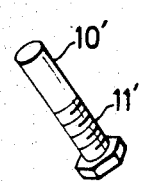
FIG. 4 shows another embodiment of the dividing-and-sealing member.

Screws 11' as shown in FIG. 4 have proved even more advantageous. These are screwed into the housing 1 in the same manner as the bolts 11, but the screws have cylindrical end portions 10'. This makes it possible to regulate the proportion of elastomer which leaks back through the grooves 7, to be pressed through once again. In this way the degree of mastication can be controlled so that the temperature of the output rubber can be varied between about 40° and 100° C. Furthermore, the members will not become as hot, thus substantially improving reliability.

As can be seen in FIG. 2, the gears are cut at an angle in herringbone fashion, with the gear teeth oppositely inclined on either side of the grooves 7. It can also be seen from the figure that the rotational direction of the gears is such that the outermost portions, as viewed along the axes of the gears, of the teeth first enter into engagement, emptying the tooth spaces by gear engagement inwardly towards the middle and thus alleviating pressure and sealing problems at the ends of the gears.

As in known gear pumps for the same purposes, sealing-and-scraping means are arranged in the space between the flat end portions of the gears and the gear housing. Since such sealing and scraping means are previously known, they will not be described in more detail here. It is worth nothing, however, that the present invention effects a sharp decrease in the strain on these seals, so that substantially higher pressures can be achieved, using the same types of sealing means, than was previously possible.

In one embodiment of the invention, the outer diameter of the gears is 198 mm, the gears are cut with a normal module of 5, helix angle 15°, pressure angle 20° and number of teeth 36. The pump is driven by a hydraulic motor with a power of 90 kW at about 70 r.p.m., resulting in a processing rate of about 25 kg of rubber per minute. Improved mastication can reduce the vulcanizing time in the mold by about 25%. The advantage of using a hydraulic motor is that the gear pump is portable, so that it can serve several different presses and be moved from mold to mold, thereby exploiting its full capacity.

What I claim is:

1. In a gear pump for injection molding and extrusion of rubber and other elastomers, said gear pump comprising two gears (2,3) mounted in a housing and in engagement with each other, two entrance holes for introduction of strip starting material (4,5) into the spaces between said gears (2,3) and said housing, midsections of said gears being provided with circumferential grooves (7) against which the teeth of said gears terminate, the improvement comprising a removable tongue (8) inserted into said grooves (7) between said gears (2,3) in the region where they are in engagement, said tongue (8) filling less than one quarter of the circumference of each of said grooves and pointing counter to the direction of rotation of said gears (2,3), dividing-and-sealing members (10,11) being inserted into said grooves (7) of said gears (2,3) at locations in said housing between the region where said gears (2,3) are in engagement and the respective entrance hole, and a channel disposed at said circumferential grooves (7) and opposite said tongue (8) for discharging the product out of the region where said gears are in engagement.

2. The improvement according to claim 1, wherein said gears (2, 3) are herringbone gears with said groove (7) passing through the intersection of the gear tooth lines, the direction of rotation of said gears (2, 3) being such that the portion of each tooth closest to said groove is the last portion of each tooth to enter into engagement.

3. The improvement according to claim 1 or 2, wherein said dividing-and-sealing members (11') comprise cylinders (10') inserted into said grooves (7).

4. The improvement according to claim 1 or 2, wherein said dividing-and-sealing members comprise members (10) fitted into said grooves (7) with a sharp edge directed counter to the direction of movement of said gears (2, 3) being anchored against being pulled along by the rotating gears by bolts (11) inserted from the outside and fastened in said gear pump housing.

* * * * *